United States Patent
Wyler

(10) Patent No.: US 10,243,648 B2
(45) Date of Patent: Mar. 26, 2019

(54) SATELLITE SYSTEM HAVING INCREASED COMMUNICATIONS CAPACITY AND METHODS FOR INCREASING THE CAPACITY OF SATELLITE SYSTEMS

(71) Applicant: WorldVu Satellites Limited, St Helier, Jersey, Channel Islands (GB)

(72) Inventor: Gregory Thane Wyler, Sewalls Point, FL (US)

(73) Assignee: WorldVu Satellites Limited, St Helier (JE)

( * ) Notice: Subject to any disclaimer, the term of this patent is extended or adjusted under 35 U.S.C. 154(b) by 68 days.

(21) Appl. No.: 15/337,114

(22) Filed: Oct. 28, 2016

(65) Prior Publication Data
US 2017/0126307 A1    May 4, 2017

Related U.S. Application Data

(60) Provisional application No. 62/247,611, filed on Oct. 28, 2015.

(51) Int. Cl.
*H04B 7/185* (2006.01)
*H04W 72/04* (2009.01)

(52) U.S. Cl.
CPC ...... *H04B 7/1851* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2009/0286467 A1* 11/2009 Miller ............... H04B 7/18543
455/3.02
2016/0315693 A1* 10/2016 Richardson ........... H04L 5/0032

FOREIGN PATENT DOCUMENTS

GB          2521459 A       6/2015
WO       2009021238 A1     2/2009

OTHER PUBLICATIONS

Officer: Y. Akhertouz Moreno, "International Search Report and the Written Opinion", International Patent Application No. PCT/IB2016/002017, Date Completed Jul. 24, 2017, 11 pp.

* cited by examiner

*Primary Examiner* — Peter Chen
(74) *Attorney, Agent, or Firm* — Kaplan Breyer Schwarz, LLP

(57) ABSTRACT

A satellite system having increased communications capacity and methods for increasing the capacity of satellite systems are disclosed.

13 Claims, 16 Drawing Sheets

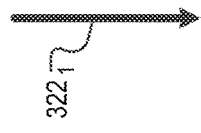
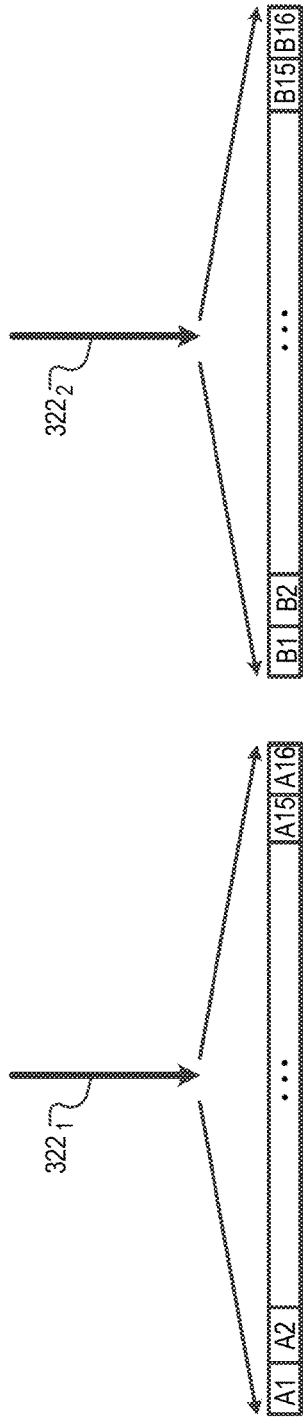
FIG. 5A
FIG. 5B

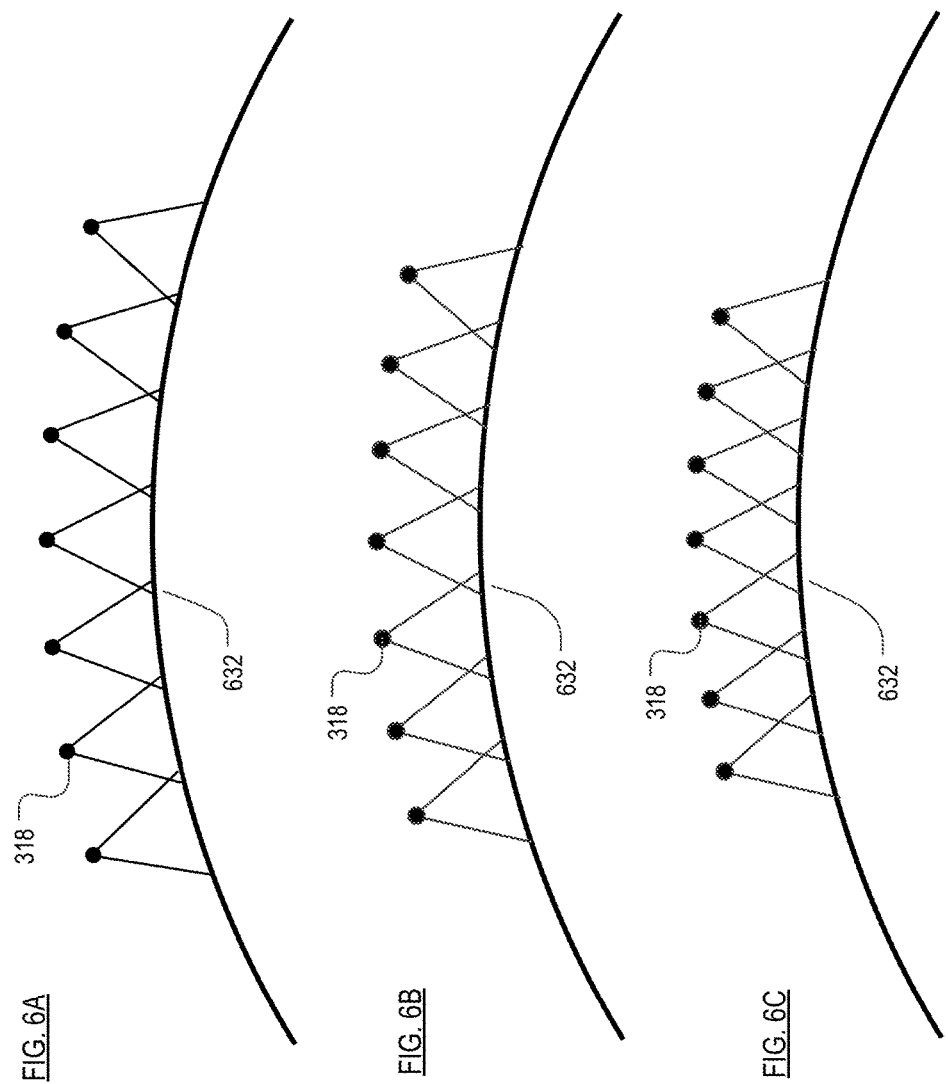

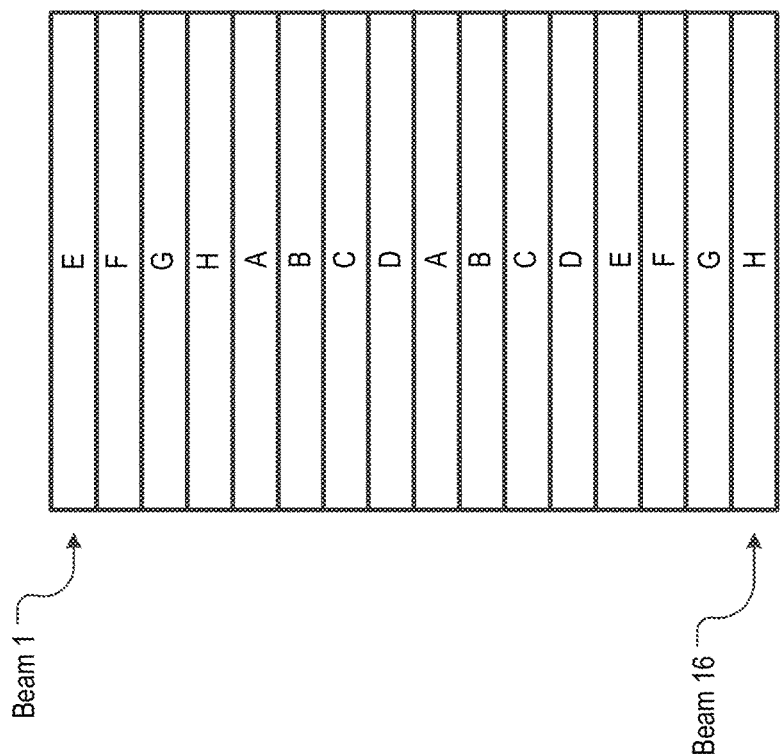

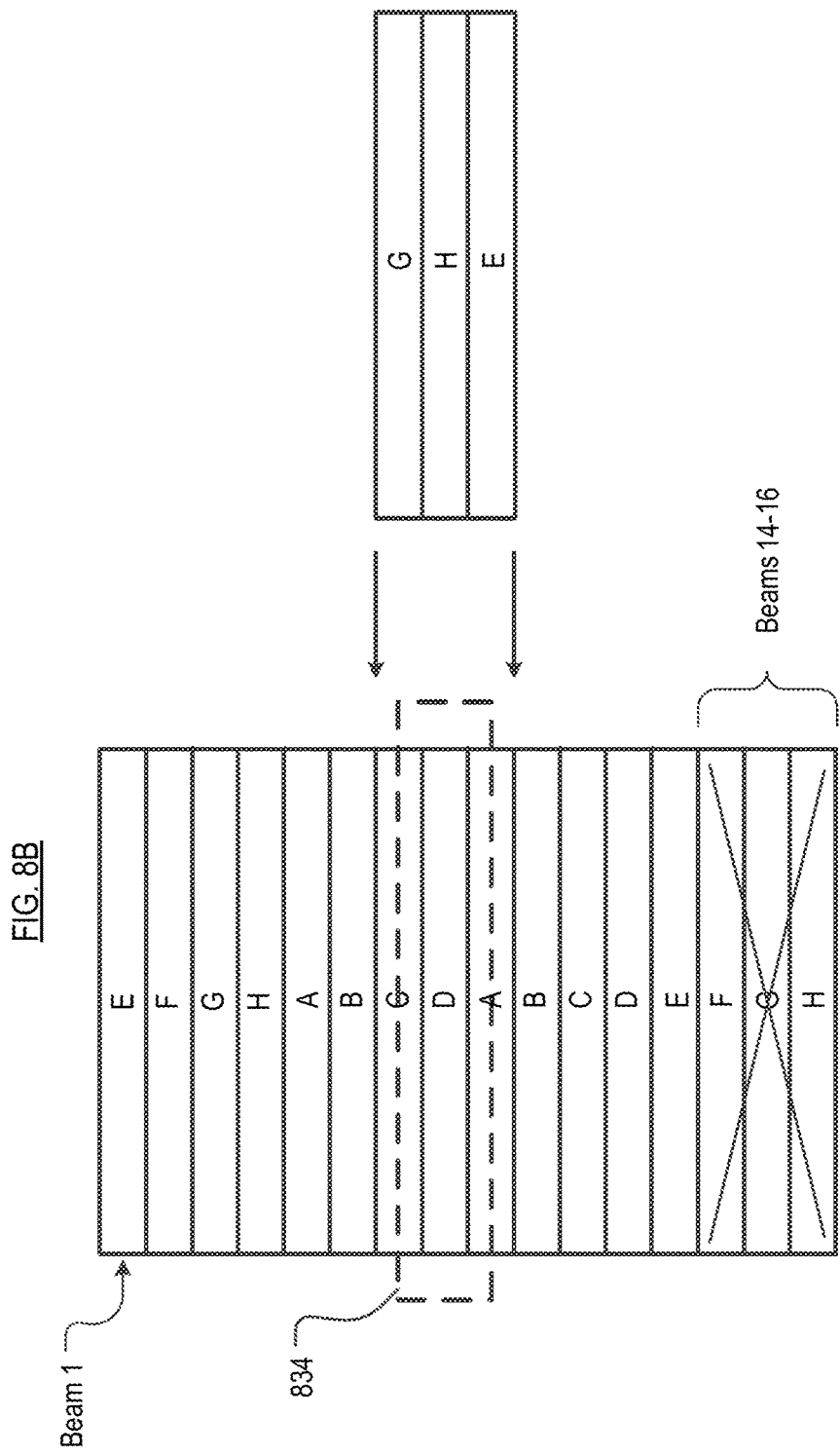

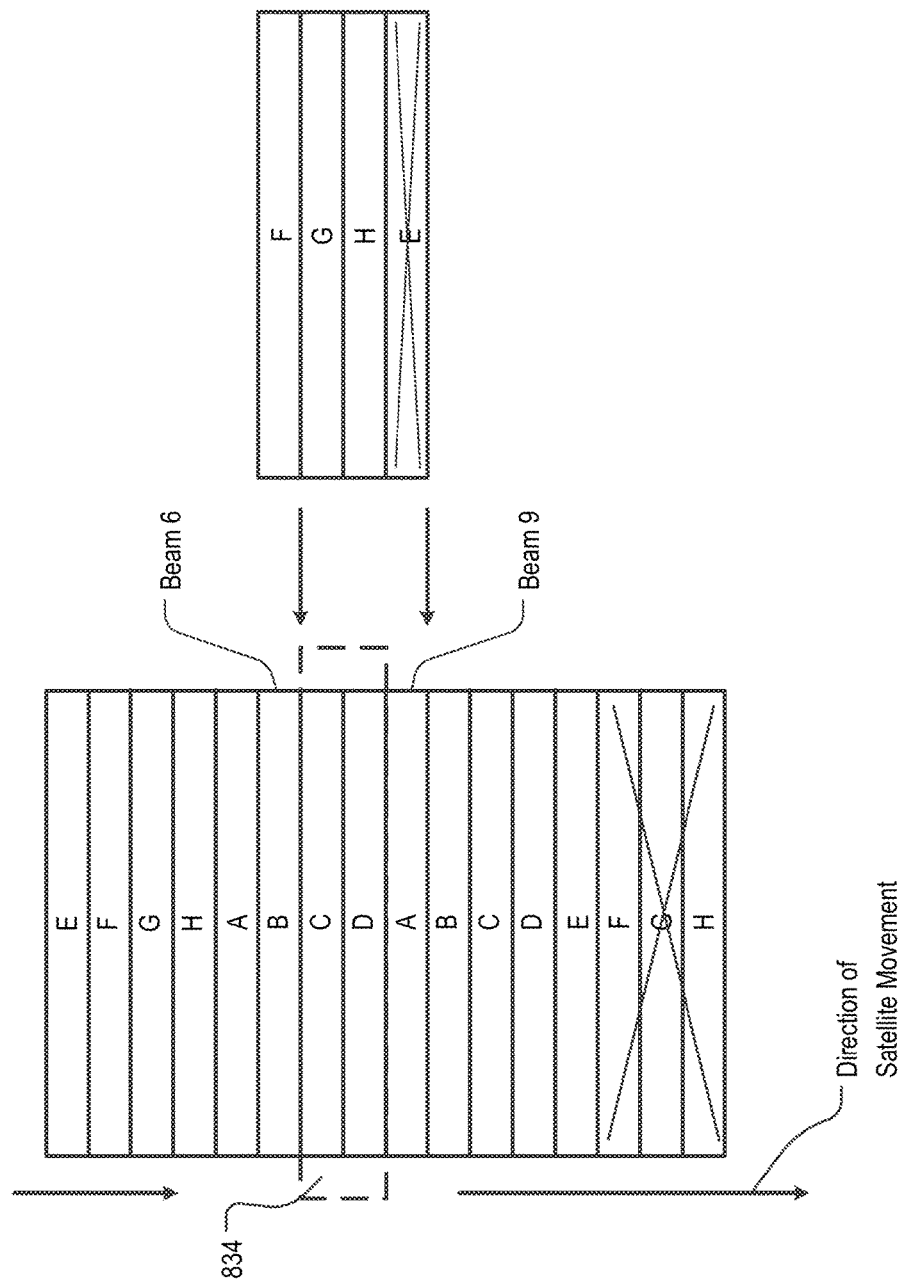

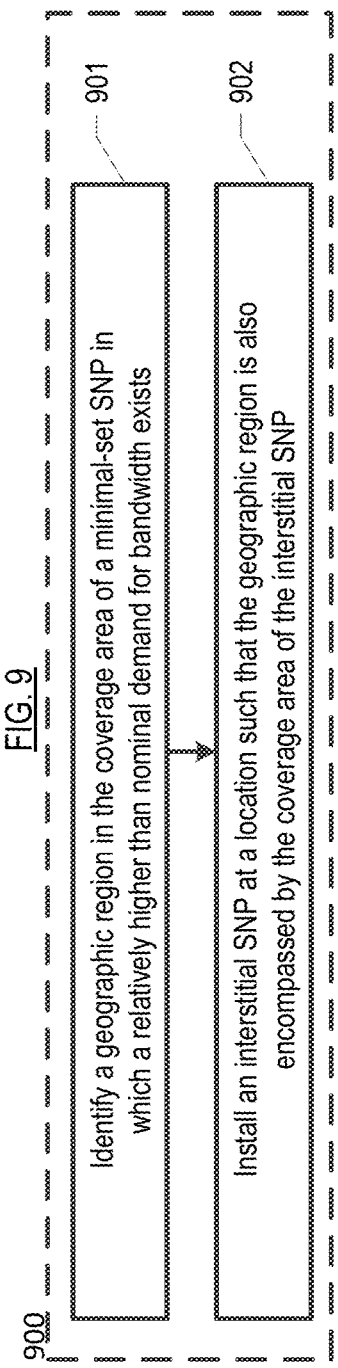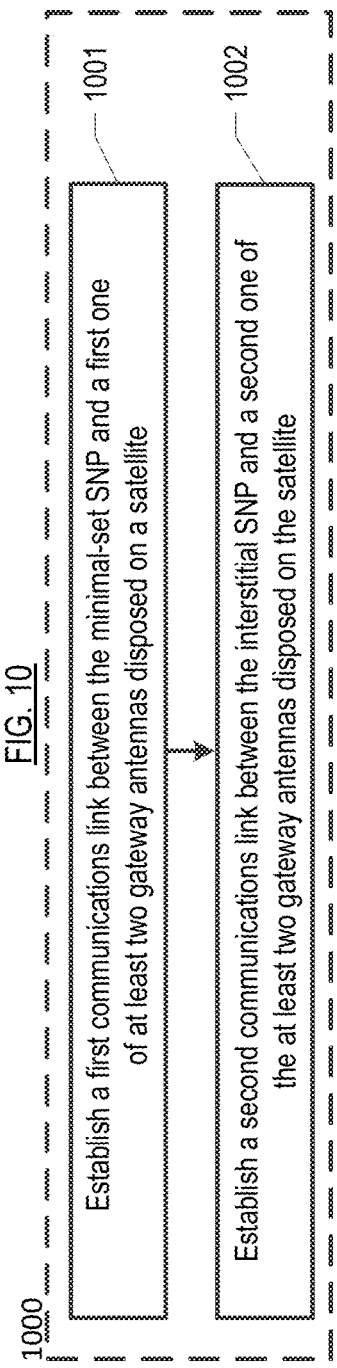

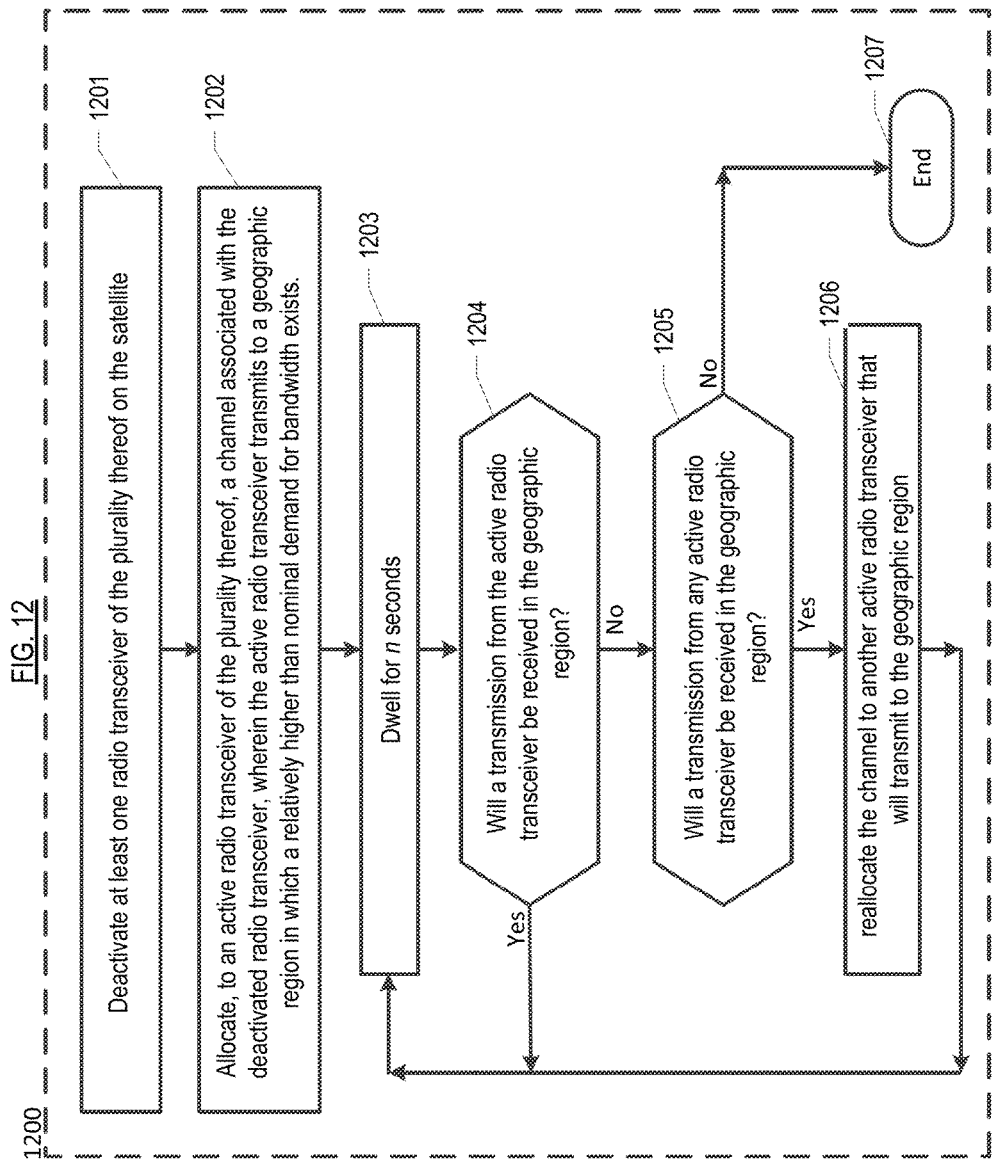

SATELLITE SYSTEM HAVING INCREASED COMMUNICATIONS CAPACITY AND METHODS FOR INCREASING THE CAPACITY OF SATELLITE SYSTEMS

STATEMENT OF RELATED CASES

This case claims priority of U.S. Patent Application 62/247,611 filed Oct. 28, 2015, which is incorporated herein by reference.

FIELD OF THE INVENTION

The present invention pertains to satellite systems.

BACKGROUND OF THE INVENTION

A non-geostationary satellite system comprises a group or constellation of satellites that orbit the earth at altitudes other than geostationary orbit (c.a. 36,000 kilometers above the earth's surface). The non-geostationary satellite systems that are in low earth orbit (LEO) have less propagation loss and less propagation delay than geosynchronous satellite systems due to the lower orbit of the non-geostationary satellites. Such satellites are, therefore, better suited than geostationary satellites for interactive communications, such as internet services.

Geostationary satellite systems have an orbital period equal to the rotation period of the Earth and therefor appear, from Earth, to be at a fixed position in the sky. Non-geostationary satellites move at relatively higher speeds and therefore appear to an earthbound observer to pass overhead from horizon-to-horizon. Because of this relative movement between non-geostationary satellites and the Earth, such satellites move in and out of range of earth-bound user terminals. Such terminals must therefore switch their communications link from one satellite to the next (i.e., hand-off) to achieve continuous communications.

In some systems, radio transmissions from the satellite to the user terminal are in the form of multiple independent beams aimed in different directions. So, in addition to earth-bound user terminals contending with the hand-off between satellites, there is a hand-off between individual beams of an individual satellite, as the coverage area of a satellite moves past a particular user.

The data throughput of such a satellite system, separate from any EPFD (equivalent power flux density) and waveform question, is a function of power and MHz/Km$^2$ of coverage. Although power can be used to increase the spectral efficiency, given as "bits/sec/Hz of bandwidth (bps/Hz), optimally enough power is applied to operate in the most efficient bits/hz/sec of QPSK (quadrature phase shift keying). If power is algorithmically set to that which achieves QPSK per the link budget, the next parameter to adjust to get more bits of data to the ground is to increase the MHz/Km$^2$.

SUMMARY

The present invention provides ways to increase the communications capacity of a satellite system.

For a given spectral efficiency, as determined by signal-to-noise ratio, the amount of data being transmitted to user terminals can be increased by adding more bandwidth. In accordance with the present teachings, bandwidth is increased using one or more of:

Interstitial Gateway Beams
Channel Stacking
Capacity Folding
Interstitial Gateway Beams.

In some embodiments, each satellite includes two gateway antennas for communicating with SNPs (i.e., ground-based gateway antennas and associated equipment). Two antennas are required on a satellite to facilitate handoff as the satellite moves between neighboring SNP coverage areas. Consequently, only one of the satellite gateway antennas is in use much of the time. The present inventor recognized that it is possible to double the data capacity over specified geographic regions by adding another SNP—an interstitial SNP—that can communicate with the (normally) unused gateway antenna on the satellite.

Channel Stacking.

The usable capacity of the normally in-use satellite gateway antenna is channelized, such as, for example, into 16 channels/signals having different discrete ranges of frequencies, which are directed to appropriate transceivers for transmission as "user" beams to ground-based user terminals. The term "channel(s)" and "signal(s)" are used interchangeably in this disclosure and the appended claims.

Using the interstitial gateway beam (resulting from communications between the interstitial SNP and the otherwise unused gateway antenna), the communications capacity between the satellite and user terminals can be doubled by "stacking" (i.e., summing) the additional 16 channels of bandwidth (received via the interstitial beam) with the 16 channels from the normally in-use gateway beam.

Capacity Folding.

If the number of satellites per plane is increased, the coverage area provided by each satellite is reduced. As coverage area is reduced, there is an overlap in coverage of the peripheral beams from adjacent satellites. For example, when the number of satellites per plane is increased from 36 to 39, two of the (16) beams of adjacent satellites overlap such that only 14 active beams are needed per satellite. The bandwidth associated with the 2 inactive beams can be added or "folded back" to some of the active channels.

Assume, by way of example, that one of the gateway antennas provides a bandwidth of approximately 4000 MHz and that bandwidth is channelized into sixteen 250 MHz channels. Using an interstitial gateway beam (as provided in conjunction with an interstitial SNP), an additional 4000 MHz of bandwidth is provided, for a total of 8000 MHz. Increasing the number of satelllites per plane from 36 to 39 frees up 2 channels per gateway antenna for a total of 1000 MHz from the two gateway antennas. This extra bandwidth can provide additional capacity to high-traffic regions. Thus, the methods disclosed herein are able (in this example) to increase the bandwidth provided to the user-link footprint of a satellite from 4000 MHz to 9000 MHz.

BRIEF DESCRIPTION OF THE DRAWINGS

FIGS. 5A-5B depict channel stacking in accordance with an illustrative embodiment of the present invention.

FIGS. 6A-6C depict the increasing overlap in user-link footprint as the number of satellites in a plane is increased.

FIGS. 8A-8C depict the manner in which excess channels, resulting from an increase the number of satellites per plane, are folded and rolled so that they remain over a particular physical area on the ground as a satellite moves in accordance with an illustrative embodiment of the invention.

FIG. 9 depicts a flow diagram of a method for siting an interstitial SNP in accordance with an illustrative embodiment of the invention.

FIG. 10 depicts a flow diagram of method for increasing available bandwidth by utilizing an interstitial SNP in accordance with an illustrative embodiment of the invention.

FIG. 12 depicts a flow diagram of a method for increasing bandwidth by deactivating redundant antenna beams and re-allocating the channels associated therewith to other antenna beams in accordance with an embodiment of the present invention.

DETAILED DESCRIPTION

Definitions

The terms appearing below are defined for use in this disclosure and the appended claims as follows:

"SNP" is an acronym for "satellite network portal." The SNP refers to the physical site that includes a number of SAPs (satellite access points), which includes the gateway antenna plus RF electronics and modem, as well as a source of power, cables, and routing and control hardware. The term "ground-based gateway antenna" will be used interchangeably with "SNP," with the understanding that the gateway antenna is just part of the equipment included in an SNP.

"Antenna beams" refers to transmissions between transceivers on the satellite and ground based user-terminals, also referred to as "satellite antenna beams" or "user beams" or transmissions between gateway antennas on the satellite and ground based SNPs, also referred to as "gateway beams."

"User-link footprint" refers to the coverage area on the ground of the satellite antenna beams.

"Substantially" and "about," when used to modify an amount/quantity/number or the like (e.g., substantially equal, about the same, etc.), means "plus or minus 15%" of the amount/quantity/number.

Additional definitions are provided throughout this disclosure in context.

The illustrative embodiment of the invention pertains to applicant's satellite system 100 for bringing low-cost, broadband internet service to any location on the earth. Embodiments of the invention are generally applicable to non-geostationary satellites that generate beams of radiation (e.g., optical, RF, or anything else) measurable on the ground, with any number of satellites (i.e., one or more).

Figure 1:
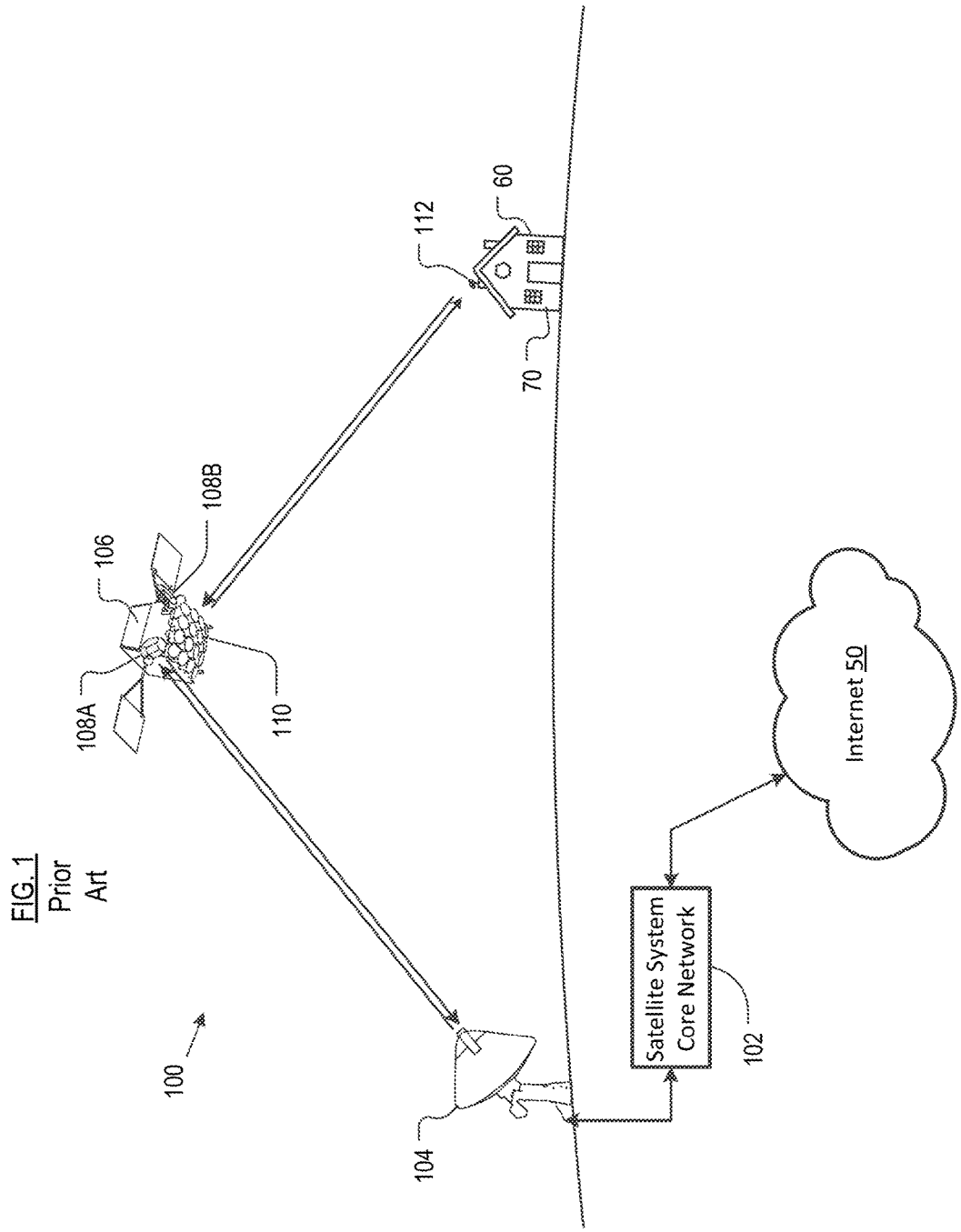
FIG. 1 depicts satellite system 100 for delivering internet service to the home, etc.

FIG. 1 depicts an illustrative embodiment of satellite system 100 and its operating environment. System 100, disclosed in earlier filed patent applications, includes core network 102, gateway antenna(s) 104, LEO satellite(s) 106, and user terminals 112. System 100 transmits data from Internet 50 to user device 70 (e.g., television, computer, tablet, smart phone, or other device capable of receiving and/or transmitting data) and vice versa.

Core network 102 receives/transmits data from/to Internet 50. Among other functions, core network 102 routes data packets to plural gateway antennas 104 for transmission to plurality of LEO satellites 106. Likewise, core network 102 receives data packets from the plurality of LEO satellites via the plural gateway antennas. In addition to containing Internet content, etc., the data packets contain system-related information, as discussed further below.

For simplicity, FIG. 1 depicts a single LEO satellite 106; it is to be understood, however, that system 100 includes a plurality of such LEO satellites, referred to as a "constellation." For example, in some embodiments, the constellation includes a very large number of satellites, such as 600 to 700 satellites. In some embodiments, the constellation of satellites is organized into plural orbital "planes," wherein each orbital plane is at a different altitude. There are typically, but not necessarily, an equal number of satellites in each orbital plane.

In the embodiment depicted in FIG. 1, user device 70 receives and/or transmits data, via user terminal 112, from or to satellite 106. User device 70 is depicted as being located within structure 60. In some other embodiments, user device 70 is used outdoors, as supported by appropriate extended telecommunications connectivity between user terminal 112 and the user device.

In the illustrative embodiment, user terminal 112 is depicted as being mounted on structure 60, which is a residence. In some other embodiments, structure 60 is a building other than a residence, such as a business (e.g., office building, restaurant, warehouse, etc.), a shed, or even a slow moving vessel, such as a cruise ship, etc. Typically, one user terminal 112 is sited at each location (e.g., residence, business, etc.) to provide internet connectivity thereto. An embodiment of user terminal 112 is provided in U.S. application Ser. No. 14/627,577, filed Feb. 20, 2015 and entitled "User Terminal Having A Linear Array Antenna With Electronic And Mechanical Actuation System."

LEO satellite 106 is equipped with plural instances of at least two different types of antennas. Antennas 108A and 108B are for communications with SNPs, which include ground-based gateway antenna(s) 104. Each such antenna communicates with one SNP at a time.

Figure 2:
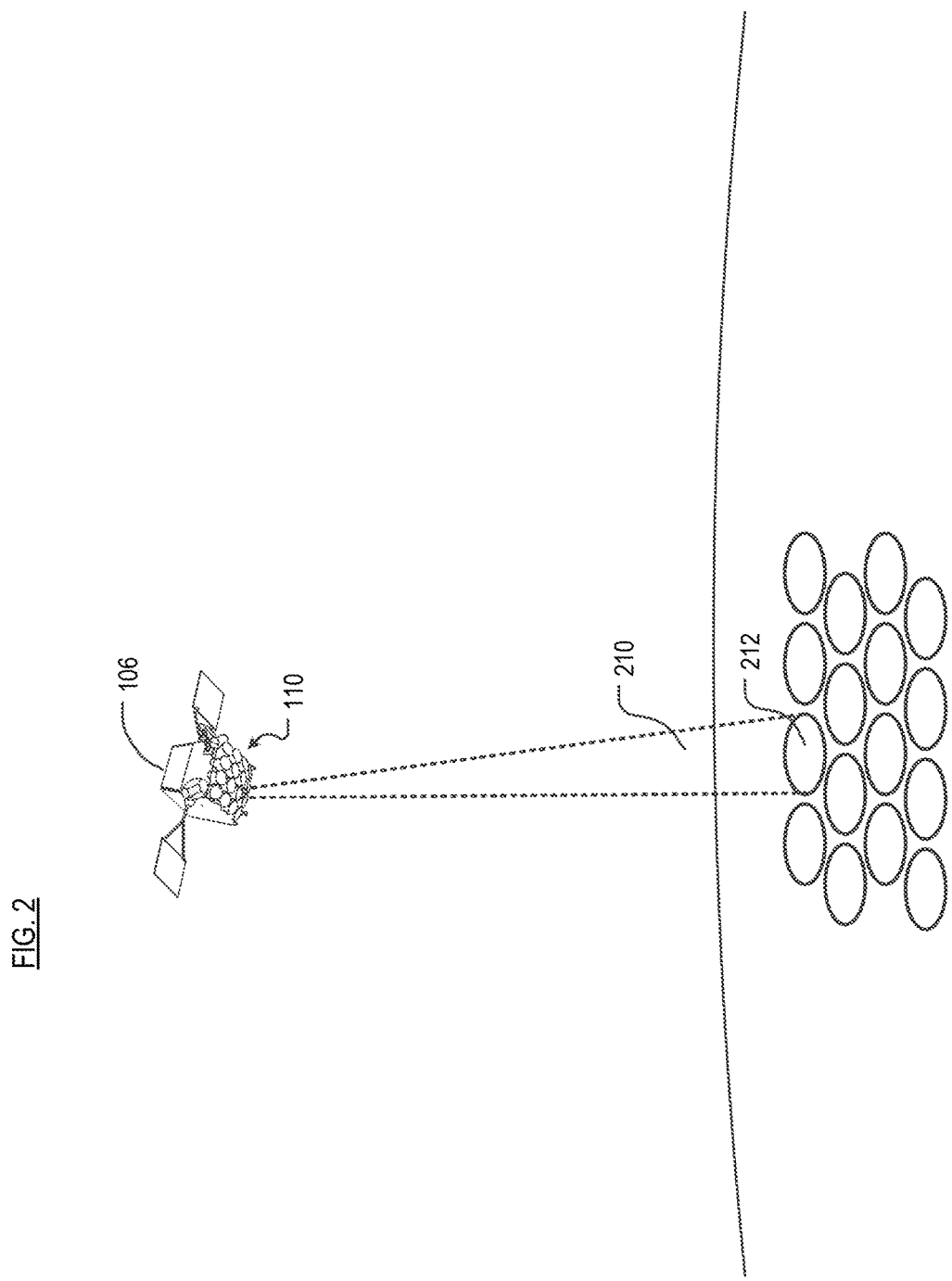
FIG. 2 depicts beams being transmitted from a satellite of system 100.

Antennas 110 are for communications with user terminals 112. In the illustrative embodiment, antennas 110 are radio antennas (and associated transceivers) for transmitting radio signals toward (or receiving them from) the surface of the Earth. Such transmissions are depicted in FIG. 2 as beams 210, each of which provides a footprint 212 on the surface of the Earth. When user terminal 112 is within footprint 212 of one of beams 210, that user terminal receives data from that radio transmission. In the illustrative embodiment, LEO satellite 106 has sixteen antennas for transmitting (or receiving) sixteen beams.

Interstitial SNPs and Gateway Beams.

Figure 3C:
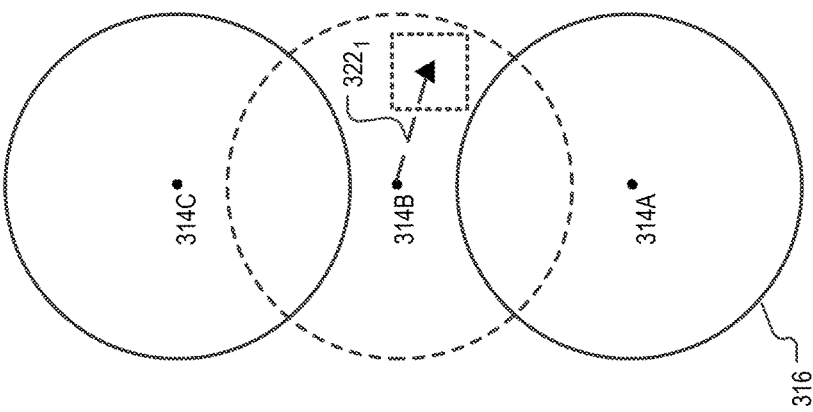
FIGS. 3A-3C depicts three SNPs and their associated coverage areas as well as the movement of a satellite over such areas.
Figure 3B:
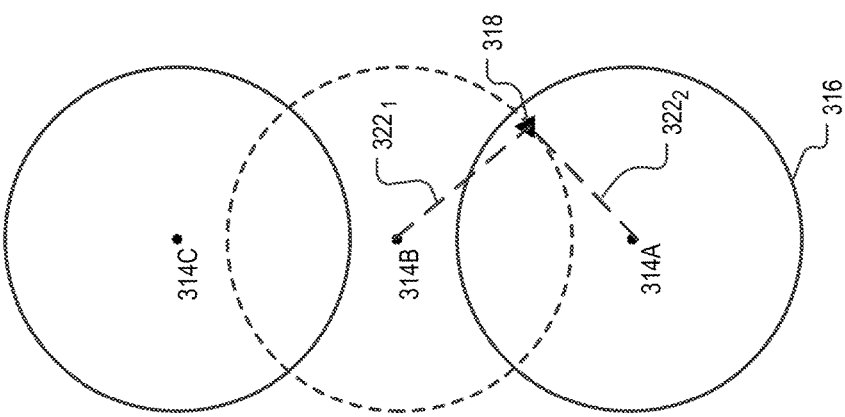
Figure 3A:
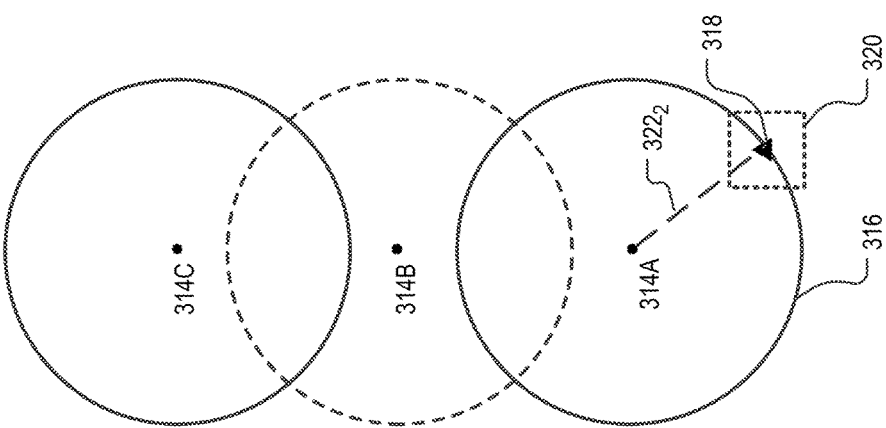

FIGS. 3A through 3C depict adjacent SNPs and the movement of a satellite along its orbit over the coverage areas of the SNPs. Each of these figures depicts three SNPs 314A, 314B, and 314C and their associated idealized coverage regions 316. SNPs 314A, 314B, and 314C are referred to herein as "minimal-set SNPs." Minimal-set SNPs represent those SNPs that are necessary to provide the desired communications coverage for system 100. Minimal-set SNP are distinguished from "interstitial SNPs," the latter used to increase bandwidth/system capacity in select coverage regions as will be discussed more fully below. It will be appreciated that many more than the three minimal-set SNPs depicted in FIGS. 3A through 3C are required to provide worldwide communications coverage.

Each of FIGS. 3A through 3C depicts satellite 318 and its associated idealized user-link footprint 320 (i.e., the ground coverage of the satellite beams). In some embodiments, the diameter of SNP coverage area 316 is about 4200 kilometers. User link footprint 320 is idealized as a square with sides having a length of about 1000 kilometers.

FIGS. 3A through 3C indicate that for most of the time, satellite 318 communicates via a single gateway beam with a single minimal-set SNP, such that only one of the satellite's (at least) two gateway antennas is in use (see, e.g., FIG. 1, gateway antennas 108A and 108B). For example, in FIG. 3A, satellite 318 uses one of its gateway antennas to communicate with minimal-set SNP 314A via gateway beam $322_2$.

For conventional operations, the only time the satellite's second gateway antenna is used is during handoff, such as depicted in FIG. 3B. In particular, one of the satellite's gateway antennas is communicating with a first minimal-set SNP, such as SNP 314A via gateway beam $322_2$, and the second of the satellite's gateway antennas is communicating with adjacent minimal-set SNP 314B via gateway beam $322_1$. FIG. 3C depicts the situation after hand-off, wherein, once again, only one of the satellite's gateway antennas is in use; that is, satellite 318 communicates with minimal-set SNP 314B via gateway beam $322_1$.

Figure 4B:
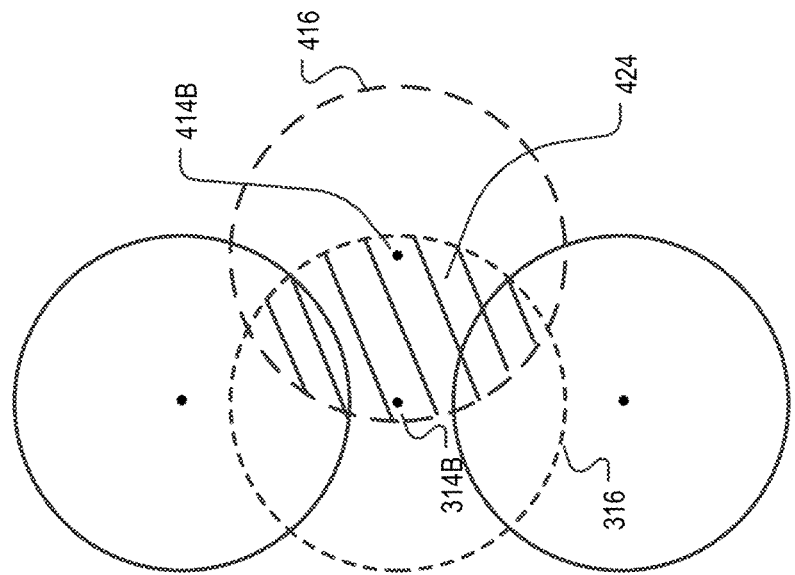
FIGS. 4B-4D depict the use of an interstitial SNP for increasing bandwidth in accordance with an illustrative embodiment of the present invention.
Figure 4A:
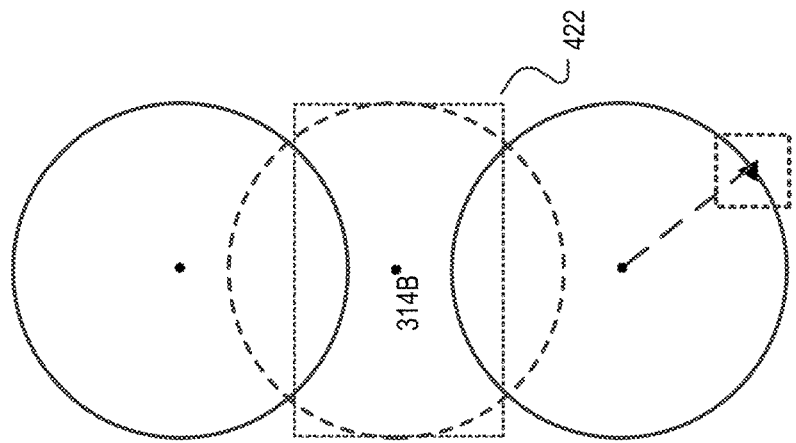
FIG. 4A depicts a region of the coverage area of an SNP wherein only one satellite-based gateway antenna is nominally in use for SNP-to-satellite communications.

FIG. 4A depicts region 422, which shows an area in the coverage region associated with minimal-set SNP 314B wherein only one of the satellite's gateway antennas will be in use (i.e., no handoff). As will be appreciated from the figures, region 422 represents a significant portion of the SNP coverage region.

Referring now to FIG. 4B locating one or more additional SNPs—an "interstitial SNP"—in region 422 in accordance with an embodiment of the present invention enables the normally idle second gateway antenna of the satellite to be used to effectively double the available bandwidth in at least portion of region 422. That portion—section 424—is where coverage zone 316 of SNP 314B and coverage zone 416 of interstitial SNP 414B overlap.

Figure 4C:
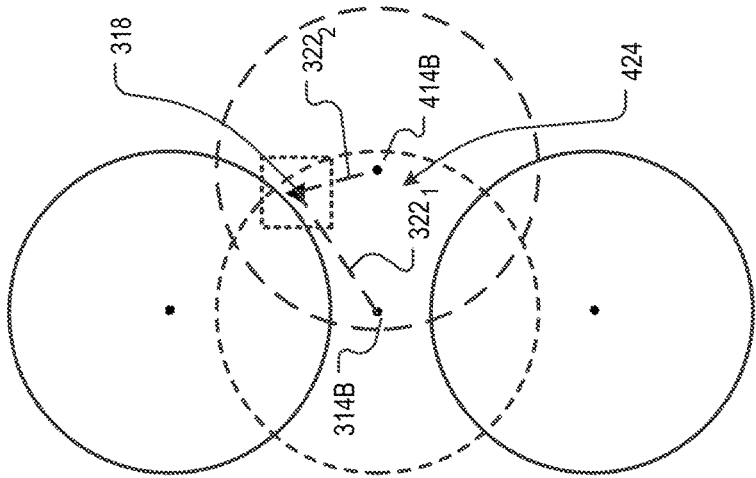
Figure 4D:
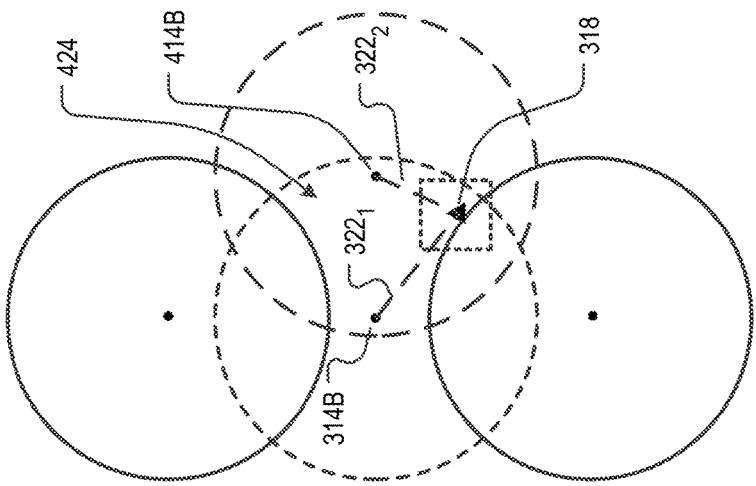

FIGS. 4C and 4D depict satellite 318 moving through section 424. As depicted in these figures, one of the satellite's two gateway antennas communicates with minimal-set SNP 314B via gateway beam $322_1$ and the other of the satellite's gateway antennas communicates with interstitial SNP 414B via gateway beam $322_2$.

Making use of the second gateway antenna in this fashion provides an ability to double the amount of information being transmitted to the satellite from the ground (uplink) or visa-versa (downlink). In an actual use case, interstitial SNPs are strategically placed in regions, such as population centers, in which there is high demand for bandwidth. Thus, by way of contrast to "minimal-set SNPs," an "interstitial SNP," as defined for use in this disclosure and the appended claims, means: an SNP that provides (to a portion of the coverage zone of the nearest minimal-set SNP) an increase in bandwidth/capacity relative to the bandwidth/capacity nominally provided by the single communications link between the minimal-set SNP and one of the satellite's gateway antennas.

As depicted in FIGS. 4C and 4D, an interstitial SNP will typically be sited closer to at least one minimal-set SNP than any minimal-set SNP will be to another minimal-set SNP. For example, in FIGS. 4C and 4D, interstitial SNP 414B is closer to minimal-set SNP 314B than any of minimal set SNPs 314A, 314B, and 314C are to one another.

The figures illustrate using a single interstitial SNP to provide additional bandwidth, since, in the illustrative embodiment, the satellite has only two gateway antennas. There are other scenarios in which more than a single interstitial SNP can be used to increase the bandwidth for a particular region. For example, if a satellite has three gateway antennas, then it is possible for the satellite to simultaneously communicate with three SNPs.

FIG. 9 depicts a flow diagram of method 900 for siting an interstitial SNP in accordance with an illustrative embodiment of the invention. In task 901, a geographic region, located in the coverage area of a minimal-set SNP and having a relatively higher than nominal demand for bandwidth is identified. In task 902, an interstitial SNP is installed at a location such that geographic region of higher demand is encompassed by the coverage area of the interstitial SNP. This location will typically be closer to the nearest minimal-set SNP than the minimal-set SNP will be to any other minimal-set SNP.

FIG. 10 depicts a flow diagram of method 1000 for increasing available bandwidth by utilizing an interstitial SNP in accordance with an illustrative embodiment of the invention. In task 1001, a first communications link is established between a minimal-set SNP and a first one of at least two gateway antennas on a satellite. Thus, a first gateway beam having some amount of bandwidth (e.g., 4000 MHz, etc.) transmits data to and from the satellite. In task 1002, a second communications link is established between an interstitial SNP and a second one of the at least two gateway antennas on the satellite.

Channel Stacking.

FIG. 5A depicts $K_a$-band gateway beam $322_1$, such as received at the satellite during conventional operation of satellite system 100 wherein satellite 318 communicates with a single minimum-set SNP 314B, such as shown in FIG. 3C. The satellite thus receives $K_a$-band gateway beam $322_1$, which is depicted in FIG. 5A being channelized in 16 channels (i.e., signals) Ai, where i=1, 16. These channels are down converted to $K_u$-band signals Ui, where i=1, 16 and applied to the satellite's beams 210 (FIG. 2) for transmission to user terminals 112 (FIG. 1). More particularly, the signals are fed to transceivers (not depicted) associated with the various satellite antennas for transmission to the user terminals.

FIG. 5B depicts $K_a$-band gateway beam $322_1$ and $K_a$-band gateway beam $322_2$, such as received at the satellite during operation of satellite system 100 in accordance with an embodiment of the present teachings, wherein satellite 318 communicates with two SNPs; minimal-set SNP 314B and interstitial SNP 418B, such as shown in FIGS. 4C and 4D.

The satellite thus receives $K_a$-band gateway beam $322_1$ and $K_a$-band gateway beam $322_2$. Both beams are channelized in 16 channels; $K_a$-band gateway beam $322_1$ into channels Ai, where i=1, 16 and $K_a$-band gateway beam $322_2$ into channels Bi, where i=1, 16. $K_a$-band channels/signals Ai are down converted to $K_u$-band channels Ui, where i=1, 16 and $K_a$-band channels/signals Bi are down converted to $K_u$-band channels Ui, where i=17, 32. The two sets of channels are "stacked;" that is, two channels are applied to each of the satellite beams for transmission to user terminals 112.

Figure 5C:
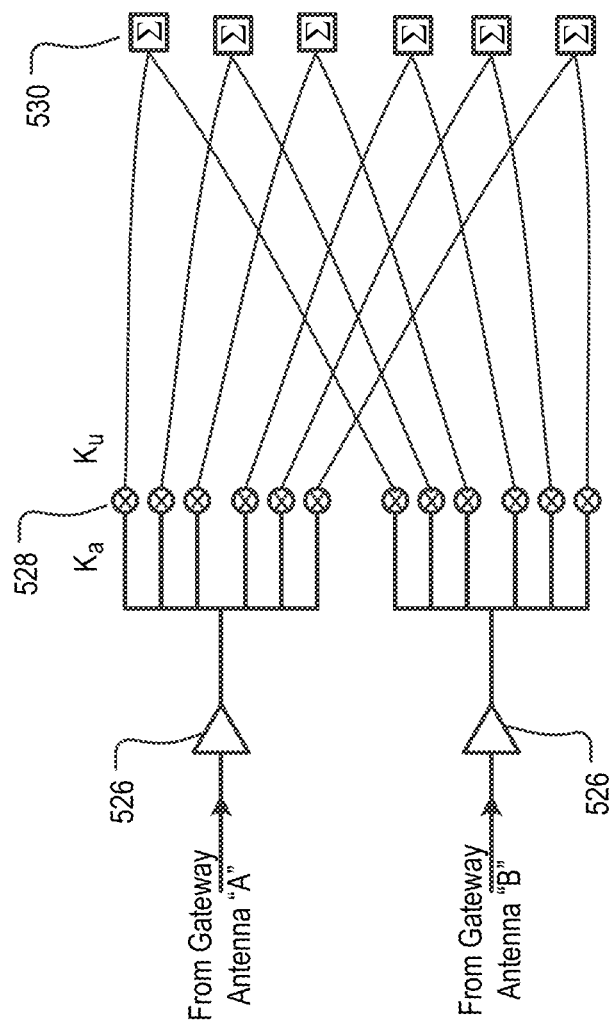
FIG. 5C depicts a further illustration of stacking in accordance with an illustrative embodiment of the invention.

FIG. 5C depicts a diagram of the satellite's payload to further illustrate the technique of stacking. The figure depicts the two $K_a$-band gateway beams (one received at the satellites "A" antenna" and the other received at the satellite's "B" antenna). The $K_a$-band signal is amplified via amplifier(s) 526, channelized (six channels are shown for each of the two incoming signals), down converted to $K_u$-band by downconverter(s) 528, and then like frequency channels sourced from the two incoming beams are summed at combiner(s) 530.

Thus, with the availability of an interstitial SNP, the bandwidth from the interstitial gateway beam can be "stacked" on the bandwidth from the first gateway beam. This effectively doubles the available bandwidth in the region covered by both the minimal-set SNP and the interstitial SNP.

Channel Folding.

FIGS. 6A through 6C depict the increasing overlap, identified as region 632, in the user-link footprint of satellites 318 as the number of satellites in a plane is increased. As a consequence of the overlap of the user-link footprint of adjacent satellites, some of the beams can be deactivated. For example, for a nominal system design of 36 satellites per plane, TABLE I shows the decrease in active beams for nominal satellite designs having 16 and 20 active beams as the number of satellites in the plane increases.

TABLE I

| Satellites per Plane | Active Beams | |
|---|---|---|
| 36 | 16 | 20 |
| 39 | 14 | 18 |
| 44 | 12 | 15 |
| 49 | 10 | 13 |

Figure 11:
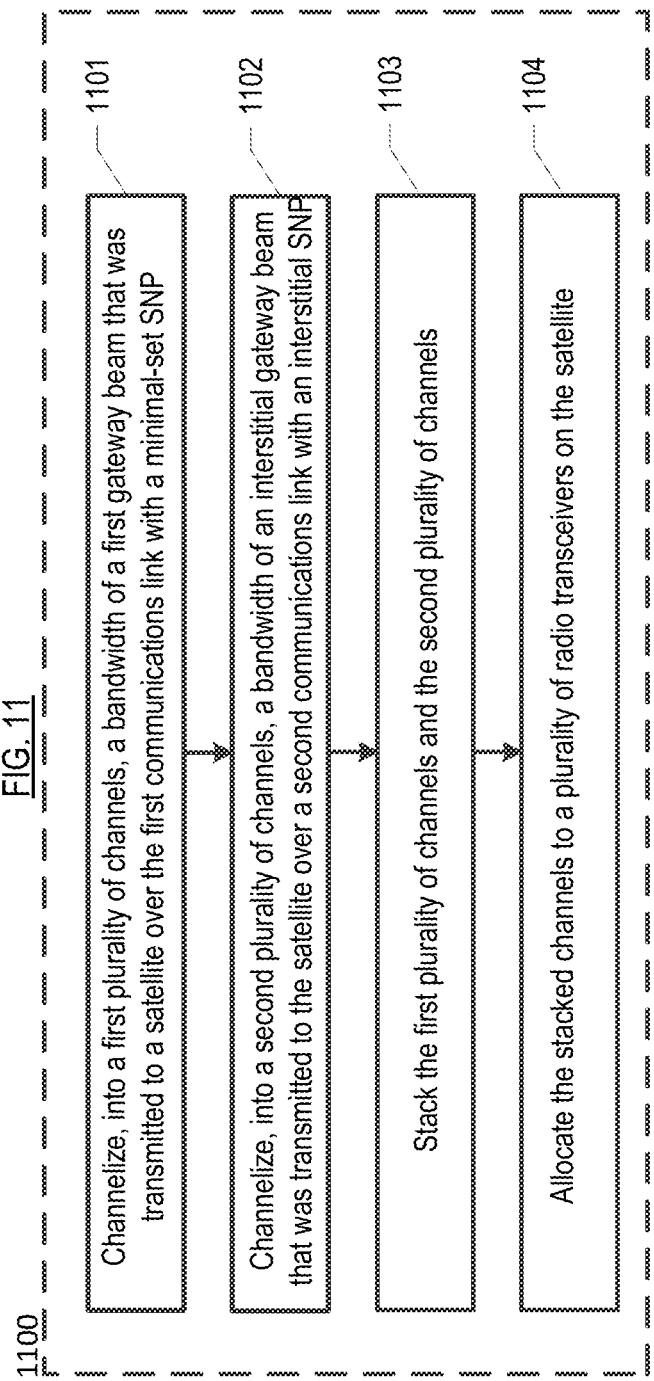
FIG. 11 depicts a flow diagram of a method for increasing bandwidth via channel stacking in accordance with an embodiment of the present invention.

FIG. 11 depicts a flow diagram of a method for increasing bandwidth via channel stacking in accordance with an embodiment of the present invention. In task 1101, the bandwidth of a first gateway beam (as transmitted over a first communications link between a minimum-set SNP and a first gateway antenna on the satellite) is channelized into a plurality of channels. In task 1102, the bandwidth of an interstitial gateway beam (as transmitted over a second communications link between an interstitial SNP and a second gateway antenna on the satellite) is channelized into a plurality of channels. In some embodiments, each plurality contains 16 channels, each having a bandwidth of 250 MHz. In some other embodiments, each plurality contains 20 channels, each having a bandwidth of 200 MHz.

Per task 1103, the two groups of channels are "stacked" and, in task 1104, allocated to a plurality of radio transceivers on the satellite, for transmission to and from ground-based user terminals. "Stacking" is not a physical operation; it simply indicates that channels having the same frequency range from the two different gateway beams will be identified and then, per task 1104, allocated to the same radio transceiver on the satellite as a function of their frequency range.

Capacity Folding.

In accordance with TABLE I, as the number of satellites per plane is increased, the number of active beams per satellite is reduced. This reduction results in extra channels which can, in effect, be folded back over onto the active channels using, for example, an appropriate internal switch matrix.

Figure 7A:
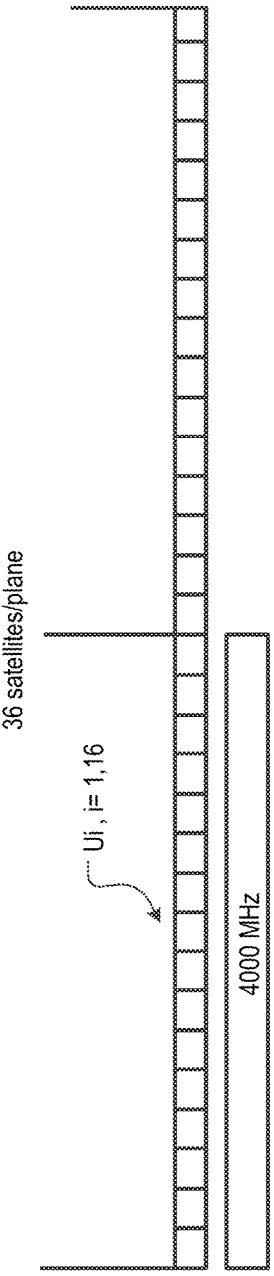
FIG. 7A depicts an example of the bandwidth provided to the user-link footprint of a satellite when there are 36 satellites per plane.
Figure 7B:
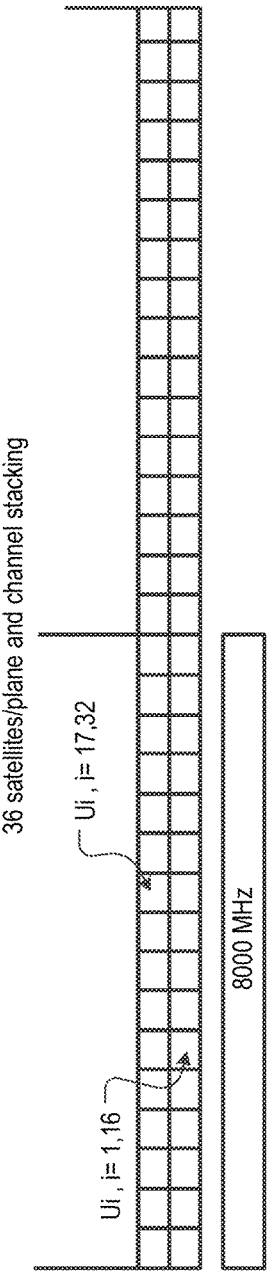
FIG. 7B depicts a doubling of bandwidth using channel stacking.
Figure 7C:
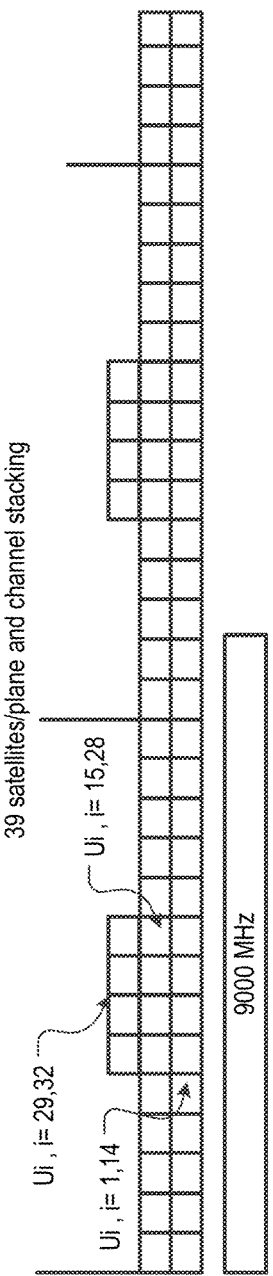
FIG. 7C depicts an increase, with respect to FIG. 7B, of bandwidth, as a result of increasing the number of satellites per plane.

An embodiment of capacity folding is depicted in FIGS. 7A through 7C. Referring to FIG. 7A, assume, by way of example, a constellation of satellites with 36 satellites per plane. Assume that the communications link between a minimal-set SNP and one of the gateway antennas on a one of the satellites provides a bandwidth of approximately 4000 MHz. And assume that the bandwidth is channelized and down-converted into sixteen, $K_u$ band, 250 MHz channels Ui; i=1, 16.

FIG. 7B depicts a doubling of bandwidth by using an interstitial SNP, wherein the interstitial SNP links to the otherwise unused second gateway antenna of the satellite, and wherein the extra bandwidth is "stacked," thus providing 8000 MHz of bandwidth as Ui; i=1, 16 and Ui; i=17, 32.

FIG. 7C depicts an increase in bandwidth, with respect to FIG. 7B, as a result of increasing the number of satellites per plane from 36 to 39. As depicted in TABLE I, this increase results in the deactivation of 2 antenna beams. With channel stacking, this equates to 4 channels (of 250 MHz each) for a total of an additional 1000 MHz that can be reallocated to other of the remaining active beams. In FIG. 7C, channels Ui; i=29, 32 are reallocated. Thus, the methods disclosed herein are able (in this example) to increase the bandwidth provided to the user-link footprint of a satellite from 4000 MHz to 9000 MHz.

The additional capacity represented by the "extra" channels can be allocated to several of the active beams. When those bandwidth-enhanced beams link with user terminals in geographic locations that have a relatively high demand for bandwidth, the extra bandwidth is well used. However, as the satellite moves, such beams will lose their link with those user terminals.

In accordance with some embodiments of the invention, this problem is addressed by "rolling" or reassigning channels to different active beams, such that the extra channels remain fixed over a physical area on the ground while the satellite moves. This concept is illustrated in FIGS. 8A through 8C.

FIG. 8A depicts footprints 812, on Earth, of sixteen antenna beams transmitted from a satellite. For ease of explanation, each footprint is depicted as rectangle. Each beam is assigned to transmit over a particular frequency channel, in the range from A (lowest frequency) through H (highest frequency). In some embodiments, the particular assignment proceeds with channels A-D on the inner beams, and channels E-H on the outer beams. This assignment pattern places the higher frequencies, which result in higher antenna gains, on the beams that travel the greatest distance (from the satellite to the ground), in order to partially compensate for free-space losses. For simplicity, only the channels sourced from one gateway antenna are shown.

In FIG. 8B, region 832 represents a fixed area on the ground that has a relatively higher demand for bandwidth than surrounding regions and is to be covered by the extra channels. The bandwidth for these extra channels comes from the deactivation of the bottom three beams 14-16 (i.e., indicated by the "x" through the footprints transmitting frequencies F-G-H). The regions that these now deactivated beams would otherwise cover are covered by the next satellite in the same orbit plane. This assumes, of course, that the satellite constellation has grown to the point where there is enough overlap of the user-link footprint of adjacent satellites to permit three beams on all satellites to be turned off. The choice of what frequency channels to use in region 832 is arbitrary, as long as each beam in that region does not use the same frequency channel twice. Again, for simplicity, the traffic from only one gateway antenna is shown.

FIG. 8C depicts the same satellite footprint, but at a later point in time, such that the satellite has moved exactly one beam width. Region 832 on the ground that is to receive the extra bandwidth has moved relative to the satellite (of course, the region on the ground has not moved; rather, the satellite has moved). In any case, it is necessary to shift the extra bandwidth to "follow" region 832. This is done by removing the extra bandwidth connection to beam 9 and simultaneously applying the extra bandwidth to beam 6. This process is repeated until the region of extra capacity is outside of the satellite user-link footprint.

Figure 8D:
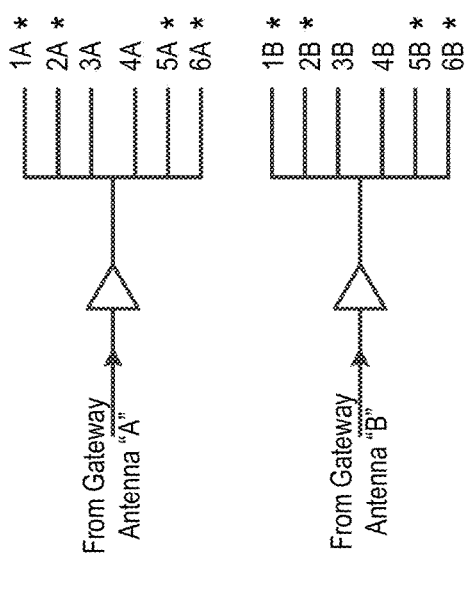
FIGS. 8D-8E depict a further illustration of channel folding and rolling in accordance with an illustrative embodiment of the invention.
Figure 8E:
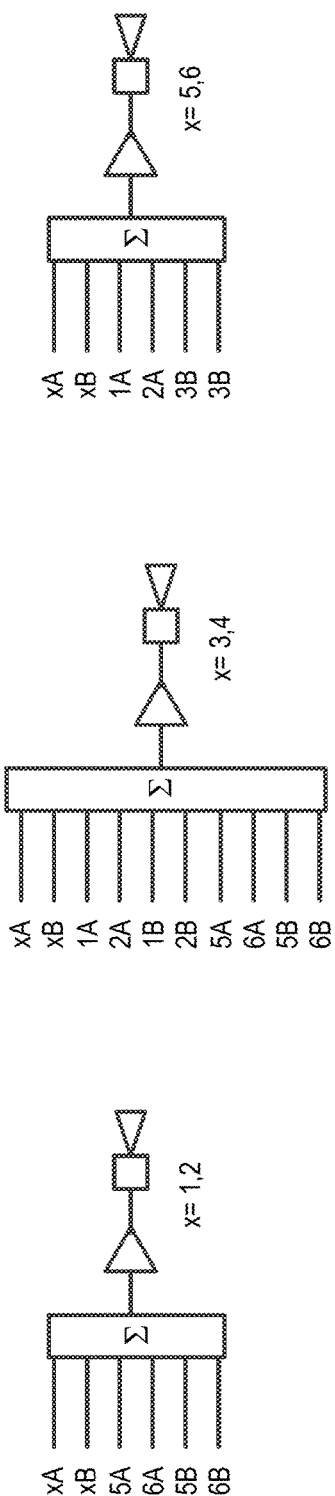

FIGS. 8D and 8E depict a diagram of the satellite's payload to further illustrate the technique of channel folding. These figures expand on what is depicted in FIG. 5C, but the summation junctions (FIG. 8E) now accept more than two inputs as per FIG. 5C.

FIG. 8D depicts the two $K_a$-band gateway beams (one received at the satellites "A" antenna and the other received at the satellite's "B" antenna). The $K_a$-band signal received at the "A" antenna is channelized into six channels 1A through 6A and the signal received at the "B" antenna is channelized into six channels 1B through 6B. The channels identified by an "asterisk" (i.e., 1, 2, 5, and 6) represent channels that would normally be sent to beams that can be deactivated (depending on which way the satellite is flying). In any case, they are outer beams. As such, these channels are available for re-allocation. So, as indicated in FIG. 8E, each beam is capable of receiving the extra channels that would have been directed to the outer beams. Selection and control is accomplished by turning "on" or "off" the amplifiers in each line. In some other embodiments, selection and control is performed via switches (not depicted). In yet some further embodiments, the switching/summing can be performed digitally in a processor. The summed signals are then sent to appropriate transceivers on the satellite for transmission to ground-based user terminals.

FIG. 12 depicts a flow diagram of method 1200 for increasing bandwidth by deactivating redundant antenna beams and re-allocating the channels associated therewith to other antenna beams, as presented in FIGS. 8A through 8C.

As previously discussed, as additional satellites are moved into a plane, an overlap between satellite antenna beams from adjacent satellites occurs. Consequently, several of the transceivers (that generate such beams) on each satellite can be deactivated. Task 1201 recites deactivating at least one radio transceiver (i.e., satellite antenna beam) on the satellite.

Task 1202 recites allocating the channel(s) associated with the one or more deactivated radio transceivers to an active radio transceiver, such that the active transceiver transmits to a geographic region in which a relatively higher than nominal demand for bandwidth exists. Since the satellite is moving, the satellite antenna beams having the extra bandwidth (due to reallocation of the channels) will move out of range of the geographic region of interest, losing connectivity therewith. The amount of time that a particular satellite antenna beam will maintain connectivity is a function of a variety of factors, but it typically will be in the range of about 8-15 seconds. Thus, prior to the query at task 1204 whether the satellite antenna beam still has connectivity with the region of interest, there is a "dwell" for a period of time at task 1203. The dwell period should be significantly less than 8-15 seconds (c.a. <0.25 seconds). If the answer to the query at task 1204 is "yes," meaning the antenna beam having the extra bandwidth is still transmitting to the region of interest, then wait for a period of time before repeating the query at task 1204.

If the response to the query at task 1204 is "no," then query at task 1205 whether any active radio transceiver has connectivity with the region of interest. If the answer to query at task 1205 is "no," it means that all beams of the satellite are out of range of the region of interest and processing (for that region) ends at task 1207.

If the response to the query at task 1205 is "yes," then, at task 1206, reallocate the previously allocated channel to another active radio transceiver that will transmit to the geographic region of interest. Then loop back to task 1203 to dwell. The sequence of tasks 1203->1204 (no)->1205 (yes)->1206->1203, etc., is repeated until the satellite is out of range of the region of interest.

It is to be understood that the disclosure describes a few embodiments and that many variations of the invention can easily be devised by those skilled in the art after reading this disclosure and that the scope of the present invention is to be determined by the following claims.

What is claimed:

1. A method for increasing the bandwidth of a satellite system, the satellite system comprising a plurality of satellites, wherein the plurality of satellites are arranged in multiple planes, with a nominal number of satellites in each plane, wherein the method comprises:
    establishing, between a minimal-set satellite network portal (SNP) having a first coverage area and a first one of at least two gateway antennas disposed on at least one satellite of the plurality thereof, a first communications link having a first bandwidth; and
    establishing, between an interstitial SNP having a second coverage area and a second one of the at least two gateway antennas disposed on the one satellite of the plurality thereof, a second communications link having a second bandwidth, wherein the second coverage area overlaps at least a portion of the first coverage area;
    channelizing, into a first group of channels each of which channels is associated with a different range of frequencies than the other channels in the first group, a first gateway beam received by the one satellite over the first communications link;
    channelizing, into a second group of channels each of which channels is associated with a different range of frequencies than the other channels in the first group, a second gateway beam received by the one satellite over the second communications link, wherein:
    (a) the first and second groups have the same number of channels,
    (b) for each channel having a particular range of frequencies in the first group, there is a channel in the second group having the same range of freauencies; and
    summing channels from the first group and the second group that have the same range of frequencies.

2. The method of claim 1 wherein the second bandwidth is substantially equal to the first bandwidth.

3. The method of claim 1 and further comprising directing the summed channels to respective radio transceivers on the one satellite for transmission to ground-based user terminals.

4. The method of claim 1 wherein the nominal number of satellites per plane is increased, the method further comprising:
   deactivating a first radio transceiver of a plurality thereof on the one satellite, the first radio transceiver having at least a first channel of the first group of channels allocated thereto; and
   re-allocating the first channel to a second radio transceiver of the plurality thereof, wherein the second radio transceiver transmits a beam to a first geographic region.

5. The method of claim 4 wherein the first radio transceiver has a first channel of the second group of channels allocated thereto, the method further comprising re-allocating the first channel of the second group of channels to the second radio transceiver.

6. The method of claim 5 and further comprising re-allocating, from the second radio transceiver to a third radio transceiver, the first channel of the first group of channels and the second channel of the second group of channels, wherein, when reallocation occurs:
   (a) the third radio transceiver is capable of transmitting to the first geographic region and,
   (b) the second radio transceiver is incapable of transmitting to the first geographic region.

7. A method for increasing the bandwidth of a satellite system, the satellite system comprising a plurality of satellites, wherein the plurality of satellites are arranged in multiple planes, with a nominal number of satellites in each plane, wherein the method comprises:
   disposing an interstitial satellite network portal (SNP) having a first coverage area relatively closer to a first minimal-set SNP than the first minimal-set SNP is to any other minimal-set SNP; and
   establishing a communications link between the interstitial SNP and one of at least two gateway antennas disposed on one satellite of the plurality thereof, wherein the communication link transmits an interstitial gateway beam that increases bandwidth nominally provided to the satellite by a communications link established between the first minimal-set SNP and a second of the at least two gateway antennas disposed on the one satellite of the plurality thereof;
   forming a first group of channels from a gateway beam received over the communications link between the minimal-set SNP and the second gateway antenna;
   increasing the nominal number of satellites per plane;
   deactivating a first radio transceiver of a plurality thereof on the one satellite; and
   re-allocatina, to a second radio transceiver of the plurality, a first channel of the first group of channels that was formerly allocated to the first radio transceiver, wherein the second radio transceiver transmits a beam to a first geographic region.

8. The method of claim 7 wherein the interstitial gateway beam substantially doubles the bandwidth provided to the satellite.

9. The method of claim 7 and further comprising:
   forming a second group of channels from the interstitial gateway beam; and
   summing channels from the first group and the second group.

10. The method of claim 9 and further comprising directing the summed channels to respective radio transceivers on the one satellite for generation of antenna beams.

11. The method of claim 7 and further comprising re-allocating, from the second radio transceiver to a third radio transceiver, the first channel of the first group of channels, wherein, when reallocation occurs:
   (a) the third radio transceiver is capable of transmitting to the first geographic region and,
   (b) the second radio transceiver is incapable of transmitting to the first geographic region.

12. A method for increasing the bandwidth of a satellite system, the satellite system comprising a plurality of satellites, wherein the plurality of satellites are arranged in multiple planes, with a nominal number of satellites in each plane, wherein the method comprises:
   disposing an interstitial satellite network portal (SNP) having a first coverage area relatively closer to a first minimal-set SNP than the first minimal-set SNP is to any other minimal-set SNP; and
   establishing a communications link between the interstitial SNP and one of at least two gateway antennas disposed on one satellite of the plurality thereof, wherein the communication link transmits an interstitial gateway beam that increases bandwidth nominally provided to the satellite by a communications link established between the first minimal-set SNP and a second of the at least two gateway antennas disposed on the one satellite of the plurality thereof;
   forming a first group of channels from a gateway beam received over the communications link between the minimal-set SNP and the second gateway antenna;
   forming a second group of channels from the interstitial gateway beam; and summing channels from the first group and the second group;
   increasing the nominal number of satellites per plane;
   deactivating a first radio transceiver of a plurality thereof on the one satellite; and
   re-allocating, to a second radio transceiver of the plurality, a first channel of the first group of channels and a first channel of the second group of channels, both of which channels being formerly allocated to the first radio transceiver, wherein the second radio transceiver transmits a beam to a first geographic region.

13. The method of claim 12 and further comprising re-allocating, from the second radio transceiver to a third radio transceiver, the first channel of the first group of channels and the second channel of the second group of channels, wherein, when reallocation occurs:
   (a) the third radio transceiver is capable of transmitting to the first geographic region and,
   (b) the second radio transceiver is incapable of transmitting to the first geographic region.

* * * * *